United States Patent
Covell

(10) Patent No.: US 8,352,489 B1
(45) Date of Patent: Jan. 8, 2013

(54) CONDITIONING MULTI-CLASS INPUT DATA FOR A COMPUTER-IMPLEMENTED DATA CLASSIFICATION SYSTEM

(75) Inventor: Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 431 days.

(21) Appl. No.: 12/338,716

(22) Filed: Dec. 18, 2008

(51) Int. Cl.
*G06F 7/00* (2006.01)
*G06F 17/30* (2006.01)

(52) U.S. Cl. .......................................... 707/769; 707/748
(58) Field of Classification Search .................... None
See application file for complete search history.

(56) References Cited

U.S. PATENT DOCUMENTS

| | | | |
|---|---|---|---|
| 6,571,227 B1 * | 5/2003 | Agrafiotis et al. | 706/15 |
| 2003/0009470 A1 * | 1/2003 | Leary | 707/100 |
| 2005/0131869 A1 * | 6/2005 | Xie et al. | 707/3 |

* cited by examiner

*Primary Examiner* — Loan T Nguyen
(74) *Attorney, Agent, or Firm* — Fenwick & West LLP

(57) ABSTRACT

Conditioned data is generated from multi-dimensional data populations. The multi-dimensional data populations include time-based media data, such as video data, or data associated with time-based media. The conditioned data is scaled such that dimensions of greater distinguishability are emphasized. To generate the conditioned data, a data conditioner receives populations of multi-dimensional data that have the same dimensions in the data. Data of a dimension is scaled based on a distinguishability factor calculated for the dimension. The distinguishability factor is calculated based on distributions in the dimension for the data populations. The data conditioning approach is scalable to any number of data populations and any number of data dimensions.

30 Claims, 3 Drawing Sheets

CONDITIONING MULTI-CLASS INPUT DATA FOR A COMPUTER-IMPLEMENTED DATA CLASSIFICATION SYSTEM

BACKGROUND

1. Field of Art

The disclosure generally relates to the field of data processing, and more particularly, relates to conditioning data to enable more effective classification of data by a computer implemented data classification system.

2. Description of the Related Art

Data classification, the separation of data into one or more classes or types, is a data processing task common to a wide variety of technical fields. As such, many conventional discriminative classifiers have been developed that group data into one or more data classes based on features of the data. However, multi-dimensional data often includes dimensional inconsistencies. For example, one dimension of data might express distances in meters and another dimension express distances in feet. Additionally, some dimensions can be more significant than others for classifying a set of multi-dimensional data.

Inconsistencies and inequalities between dimensions can obscure or distort critical features of multi-dimensional data, adversely affecting the performance of conventional discriminative classifiers.

SUMMARY

A computer implemented method conditions multi-dimensional data populations in a data classifier. The conditioned data is stored in a computer memory comprising a computer-readable storage medium. The multi-dimensional data populations can comprise time-based media data, such as video data, or data associated with time-based media. To generate conditioned data, a data conditioner receives a first data population of multi-dimensional data and a second data population of multi-dimensional data. The first and second data populations have the same dimensions in the data. The data conditioner determines a first distribution of the first data population in a first dimension and, a second distribution for the second population, also in the first dimension. The data conditioner determines a distinguishability factor between the first distribution and the second distribution. The data conditioner scales data of the first dimension that is included in the first and second data populations by the determined distinguishability factor to produce conditioned data. The data conditioner repeats the conditioning process for each dimension of the data. The data conditioning process is scalable to any number of data populations and any number of data dimensions. Furthermore, the data conditioning process is applicable to any type of data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architectural Overview

Figure 1:
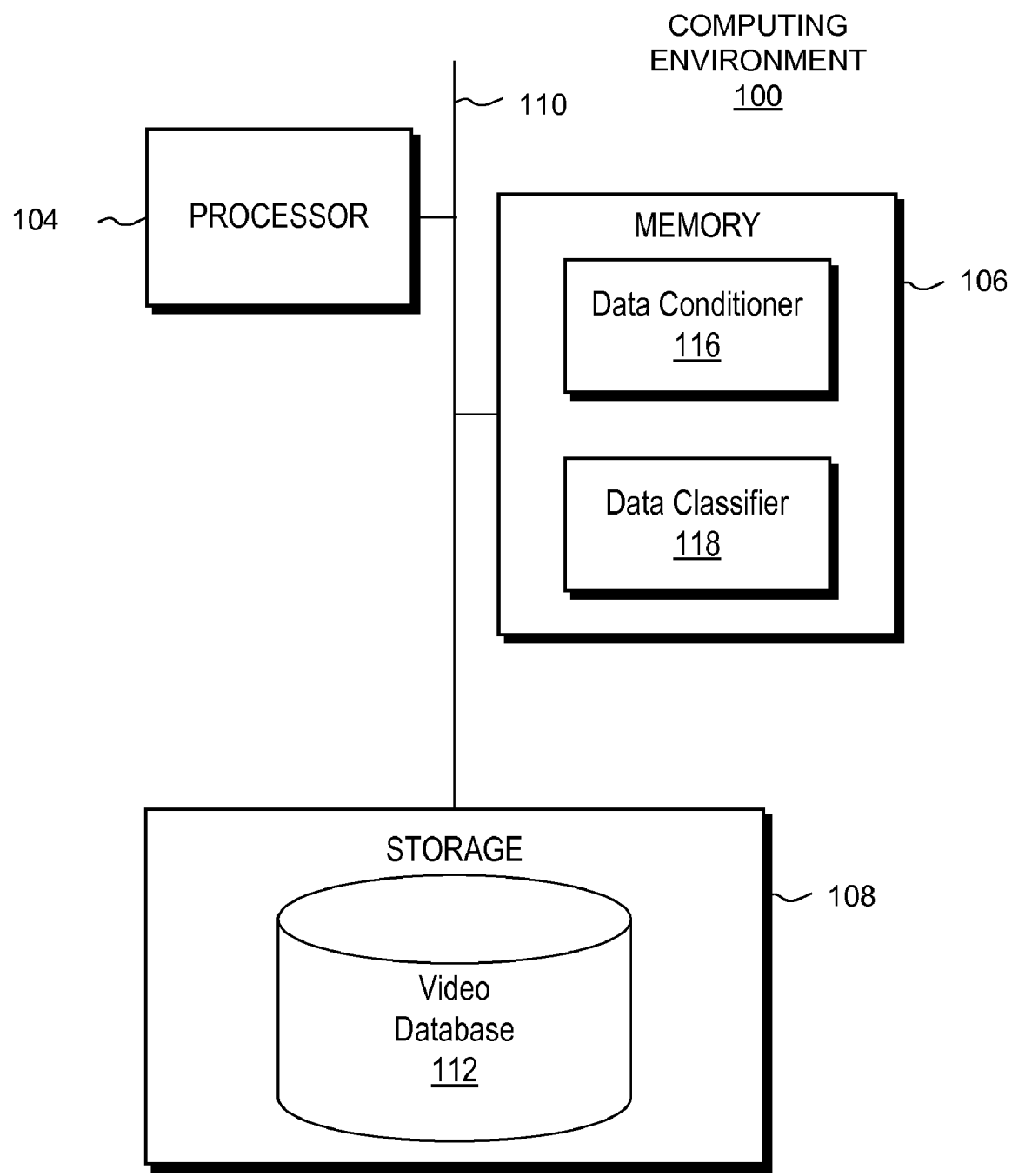
FIG. 1 illustrates one embodiment a system for conditioning data.

FIG. 1 illustrates an exemplary computing environment 100 for conditioning and classifying data. Specifically, the illustrated computing environment 100 conditions and classifies video data, but any type of data representing real world entities that are to be classified. A real world entity is an instance of any entity or event in the real world. An instance of a person and an instance of a hockey game are both real world entities. However, real world entities can be works of imagination, such as book of fiction, a fake news story, an abstract painting, or a computer-generated digital image. All of these events are still instances of their respective types and can be conditioned and classified according to the teachings described herein. The computing environment 100 comprises a processor 104, a memory 106, and storage 108 all communicatively coupled by a bus 110.

The storage 108 is a data repository and comprises a computer-readable storage medium and includes a video database 112. The storage 108 can be any device or combination of devices capable of storing data, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

The video database 112 stores populations of multidimensional data related to videos. Each video is represented by a multidimensional feature vector. The multidimensional feature vector for a video can include dimensions comprising color histogram data, compression coefficients, motion vectors and other data relevant for the video. Some data populations, referred to herein as classified populations, include multidimensional feature vectors for videos that have been determined as corresponding to a particular class (e.g., type of video). For example, a first classified data population can be a skiing class and comprise multidimensional feature vectors for skiing videos. A second classified data population can be an animated class and comprise multidimensional feature vectors for animated videos (e.g., cartoons). Any number or type of class is possible. The designation of which videos (or more generally entities) belong to which class or population can be made manually by system user, or automatically via search, clustering, or other matching algorithms. Other data populations, referred to herein as unclassified populations, include multidimensional feature vectors for videos that have not yet been associated with a class. The examples of classes and dimensions provided above are provided for illustrative purposes, and multidimensional data different from that described above can be processed according to the teachings herein.

The data stored by the video database 112 is processed by the processor 104 according to computer-executable instructions stored in the memory 106 that implement the data classifier 118 and the data conditioner 116. The processor 104 may comprise one or more general-purpose processors. In one embodiment, the processor 104 is a server-class processor with a high-performance CPU and 1G or more of memory that runs an open-source operating system such as LINUX. Other types of processors can also be used, and it is expected that as more powerful processors are developed in the future, they can be configured in accordance with the teachings here.

The memory is a computer-readable storage medium that can comprise, for example, read-only memory (ROM), non-volatile random access memory (NVRAM), and/or RAM, and holds computer-executable computer program instructions and data used by the processor 104. In one embodiment, the memory 106 includes a data conditioner 116 and a data classifier 118. The data conditioner 116 and the data classifier 118 can comprise computer-executable instructions for processing data.

The data classifier 118 classifies a video as corresponding to a class of data based on characteristics of the associated multidimensional feature vector. For example, the data classifier 118 can process an unclassified data population and determine some of videos as corresponding to the skiing class and some of the videos as corresponding to the animated class. The data classifier 118 transforms the unclassified data into classified data using one or more conventional data classification algorithms. The data classifier 118 can be implemented as a support vector machine (SVM) or as a log likelihood ratio that operates across parametric probability distribution models for each class. Suitable parametric probability distribution models include Gaussian models, Gaussian Mixture Models (GMM's), Bernoulli models, and Hidden Markov Models (HMM's).

The data conditioner 116 improves the performance of the data classifier 118 by conditioning classified data populations that are used to train the data classifier 118. The data conditioner 116 can be used to directly scale the unclassified data populations prior to classification of the unclassified data populations by the data classifier 118. The parameters of the data classifier 118 can also be modified to include scaling determined by the data conditioner 116. The data conditioner 116 produces the conditioned data by transforming one or more populations of data into conditioned data. In one embodiment, based on a classification algorithm employed by the data classifier 118, the data conditioner 116 determines a significance factor of each dimension of classified data populations. The significance factor is a measure of the significance of the dimension for classification purposes; some dimensions of the data are significant for classification in that they strongly influence or contribute to the classification of the populations, while other dimensions are less significant in that they do not aid in discriminating between populations.

The data conditioner 116 scales the classified data populations in a dimension-wise manner based on the determined significance factor of each dimension. When used as training data, the conditioned data produced by the data conditioner 116 therefore improves performance of the data classifier 118 by using training data in which data dimensions are adjusted in proportion to their significance for classification. When used as input data for classification, the conditioned data produced by the data conditioner 116 produces a more reliable classification result by the data classifier 118 because the dimensions have been emphasized according to significance for classification. Further details of a data conditioning process are provided below.

Numerous variations from the system architecture of the computing environment 100 are possible. The components of the computing environment and their respective functionalities can be combined or redistributed. For example, the video database 112 can be distributed among any number of storage devices. Furthermore, distributed system architectures are possible wherein one or more components of the computing environment 100 are housed in separate computing devices and communicatively coupled via a network.

Operational Considerations

For many data classification algorithms, some dimensions are more significant than others for classifying members of the data populations. For example, the members of two different data populations may have very similar data in some dimensions and yet also have very different data in other dimensions. In one embodiment of the data classifier 118, dimensions for which members of a data population exhibit a relatively low degree of similarity are more significant for classifying the members of the data populations than dimensions for which the members of data populations exhibit a relatively high degree of similarity. As one example, in a population of videos, if the multidimensional feature vectors for most videos (members) of the population are similar in visual dimensions (e.g., color), then these dimensions of the data do not significantly aid in classifying the videos. If on the other hand, the same multidimensional feature vectors vary widely in audio dimensions, then these dimensions of the data may be more significant for classification.

Figure 2A:
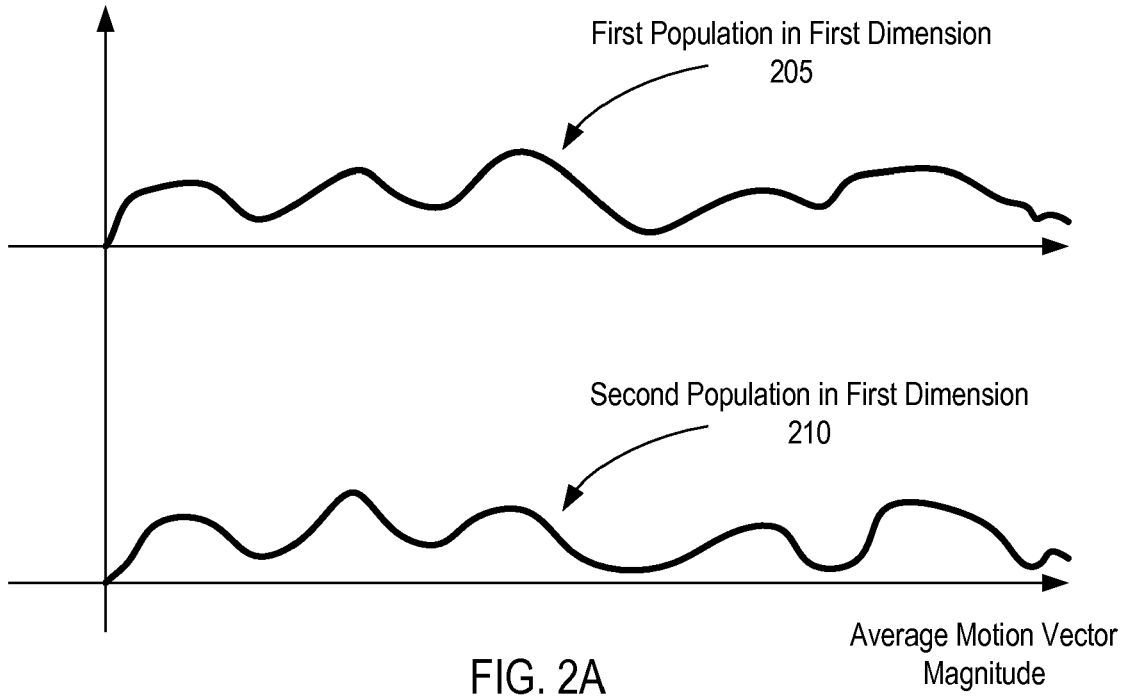
FIG. 2A illustrates sample data distributions in a first dimension.
Figure 2B:
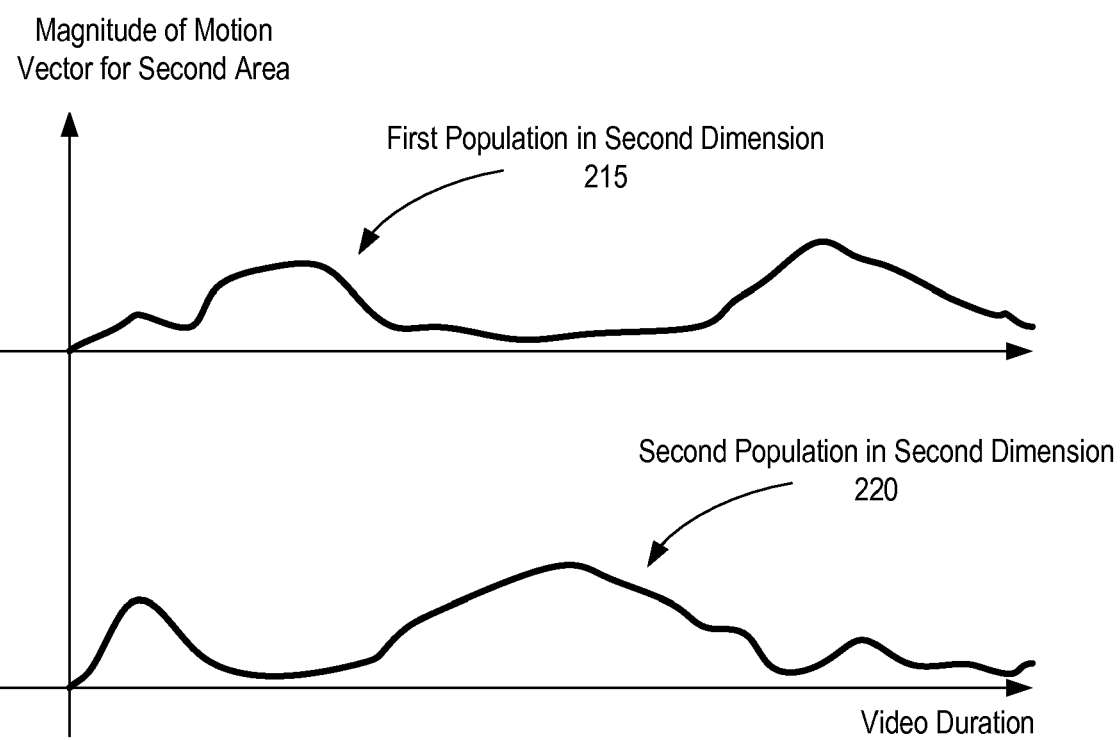
FIG. 2B illustrates sample data distributions in a second dimension.

Referring now to FIGS. 2A and 2B, distributions for two exemplary data populations are illustrated for two dimensions of the data. FIG. 2A illustrates data in a first dimension for a first data population 205 and a second data population 210. FIG. 2B illustrates data in a second dimension for the first data population 215 and the second data population 220. In this example, the first dimension comprises average motion vector magnitude (or a derivative thereof) for the respective videos in the first data population 215 and the second data population 220. For illustrative purpose, FIG. 2A depicts a probability distribution 205 of the average motion vector magnitudes for a first classified population of videos and a probability distribution 210 of the average motion vector magnitude for a second classified population of videos. FIG. 2B depicts a probability distribution 215 of a second dimension of video durations for the first classified population of videos and a second distribution 210 of video durations for the second classified population of videos. The first population of videos and the second population of videos exhibit similar levels of motion. However, the videos of the first population tend to either be fairly brief or fairly long while the videos of the second population tend to be of a medium length. The similarity or differences between the distributions can be identified algorithmically.

Hence, as shown by FIG. 2A, the distributions for first data population in the first dimension 205 and the second data population in the first dimension 210 exhibit similar features, whereas FIG. 2B, shows that the distributions for the first data population in the second dimension 215 and the second data population in the second dimension 220 exhibit noticeably different features. For example, in FIG. 2B it can be seen that the second population has a significant cluster of its members in the middle of the distribution, while the first population has relatively few of its members clustered in the middle. And while both distributions in the second dimension are bimodal, the locations of those modes 1.1, 1.2, and 2.1, 2.1 are quite different.

Hence, the two illustrated data populations are more similar the first dimension than in the second dimension and, in one embodiment of the data classifier 118, the two illustrated data populations are more easily distinguished and classified based on the second dimension than the first dimension. The second dimension (video length) can therefore be described as having a higher significance than the first dimension (average motion vector magnitude) for discriminating between the two classes of videos represented by the first and second populations. In this case, because the relative significance of the two dimensions is due to the data populations being more easily distinguishable in the second dimension than the first dimension, the second dimension can also be described as having a higher "distinguishability factor" than the first dimension.

In one embodiment, the data conditioner 116 conditions data populations to produce conditioned data that emphasizes dimensions with higher distinguishability factors over dimensions with lower distinguishability factors. Hence, for the data illustrated in FIGS. 2A and 2B, the data conditioner 116 produces conditioned data that emphasizes the second dimension over the first dimension. Training the data classifier 118 with conditioned data produced by the data conditioner 116 emphasizes dimensions of greater use in classifying the data, thereby improving performance of the data classifier 118. This can result in more accurate classification for a given observation length, and therefore be reflected by precision/recall curves produced by the data classifier 118, or it can help maintain classification accuracy while utilizing fewer observations of the input data, thereby increasing a speed with which the data classifier 118 classifies a set of data and decreasing an amount of processor bandwidth or computations required to classify a set of data.

Referring now to FIG. 3A, a process for conditioning data is illustrated. First, the data conditioner 116 receives 305 any number of multi-dimensional data populations, the data populations including member vectors that have data values corresponding to the same dimensions. The data conditioner 116 selects 310 at least a first dimension of the data. In one embodiment, the data conditioner 116 then determines 315 a distribution for each of the data populations in the first dimension and determines 320 a distinguishability factor for the first dimension. The distinguishability factor can be proportional to a degree of similarity or dissimilarity between the determined 315 dimensions. Hence, in one embodiment of the data classifier 118, the determined 320 distinguishability factor is a measure of the first dimension's significance for classifying the received 305 data populations. The data conditioner 116 then scales 325 the received 305 data populations in the first dimension by the determined 320 distinguishability factor.

Determining 315 a distribution for each of the received 305 data populations in the first dimension can comprise determining 315 a first marginal probability distribution for a first data population in the first dimension, determining 315 a second marginal probability distribution for a second data population in the first dimension, and so on until a marginal probability distribution in the first dimension has been determined 315 for each received 305 data population. This can be done after a rotation of data axes as well, ensuring that a projection vector used in marginalization is not axis-parallel.

Determining 320 a distinguishability factor can comprise calculating a symmetric Kullback-Leibler (KL) divergence for each pair of the determined 315 distributions. The Kullback-Leibler divergence for a pair of probability distributions is a measure of dissimilarity between the two distributions. A KL divergence for two distributions, P(x) and Q(x), indicates a difference between two numbers, the first number being the number of bits required to transmit a set of samples with distribution P(x) using Shannon coding based on P(x), and the second number being the number of bits required to transmit the set of samples with distribution P(x) using Shannon coding based on Q(x). The symmetric KL divergence is the average across the two combinations of P(x) and Q(x) and is found by halving the quantity [H(P,Q)−H(Q,Q)+H(Q,P)−H(P,P)], wherein H(A,B) represents the cross entropy of distributions A(x) and B(x), expressed mathematically as $$-\sum_x A(x)\log(B(x)+\varepsilon)$$

in which $\varepsilon$ is a small regularization term. The KL divergence for two distributions, and therefore the corresponding symmetric KL divergence, is 0 when the two distributions are identical and increases as the two distributions become more and more distinct from one another and therefore more distinguishable.

When processing multiple data populations that require multi-class classification (instead of just single-pair classification), multiple KL factors can be computed for a single dimension (one for each pair of data populations within the set). In one embodiment, the data conditioner 116 resolves multiple KL factors for a dimension based on how the data classifier 118 distinguishes between classes. For example, consider data populations for which four classes (C1, C2, C3, C4) are possible, the data populations therefore requiring multi-class classification.

If the data classifier 118 is designed so as to use four one-to-many classifiers (C1 vs. not-C1; C2 vs. not-C2; C3 vs. not-C3; C4 vs. not-C4) and to then assign the class determined to have the strongest classification, the data conditioner 116 similarly calculates four symmetric KL divergence measures (C1 vs. C2+C3+C4; C2 vs. C1+C3+C4; C3 v. C1+C2+C4; C4 v. C1+C2+C3) and scales each population in a dimension-wise manner based on the corresponding one-to-many KL divergence. If the data classifier 118 is instead designed to use six one-to-one classifiers (C1 vs. C2; C1 vs. C3; C1 vs. C4; C2 vs. C3; C2 vs. C4; C3 vs. C4) and to then assign the class determined to have the highest number of votes and lowest number of anti-votes, the data classifier 116 similarly calculates six symmetric KL divergence measures (C1 vs. C2; C1 vs. C3; C1 vs. C4; C2 vs. C3; C2 vs. C4; C3 vs. C4) and scales each data population in a dimension-wise manner based on the corresponding one-to-one KL divergence.

Other distinguishability factors can be determined 320 and used according to the teachings described herein. For example, determining 320 a distinguishability factor between a first distribution and a second distribution can comprise computing a modified divergence measure that is a summation across a distribution axis of the maximum probability distribution multiplied by the log of the minimum probability distribution or a summation across a distribution axis of the minimum probability distribution multiplied by the log of the maximum probability distribution. An example of such a distinguishability factor is calculated using the techniques described for calculating a KL factor, but with H(A,B) replaced by H'(A,B), wherein H'(A,B) is expressed mathematically as $$-\sum_x \min(A(x), B(x))\log(\max(A(x), B(x))).$$

This alternative distinguishability factor is particularly suitable for instances where one of two distributions comprises values close to zero while the other comprises values far from zero. Determining 320 a distinguishability factor between a first distribution and a second distribution can also comprise computing a summation across a distribution axis of an absolute difference between the two probability distributions, expressed mathematically for two distributions P(x) and Q(x) as $\Sigma |P(x)-Q(x)|^a$ for any a >0.

Scaling 325 a dimension of data for the received 305 data populations can comprise multiplying data of the dimension by the distinguishability factor corresponding to the dimension. Other scaling techniques are possible, provided data of dimensions with high distinguishability factors are increased in amplitude relative to data of dimensions with low distinguishability factors, including scaling techniques that corresponded to non-linear functions of the scaling factor and data. For example, scaling 325 a dimension based on a distinguishability factor can comprise increasing amplitudes of data for a more-distinguishable dimension relative to amplitudes of data for a less-distinguishable dimension in a non-linear manner such that variability is increased for data of the more-distinguishable dimension relative to data for the less-distinguishable dimension.

After determining distributions 315 for the first dimension, determining 320 a distinguishability factor for the first dimension, and scaling 325 the first dimension data by the distinguishability, the data conditioner 116 determined 330 if there are any more dimensions left to process. If so (330—Yes), the data conditioner 116 repeats the process until all dimensions of the received 305 data populations have been scaled 325. The data conditioner 116 outputs 335 the transformed data as conditioned data. The conditioned data is stored in a data repository, such as the video database 112 included in the storage 108.

Figure 3:
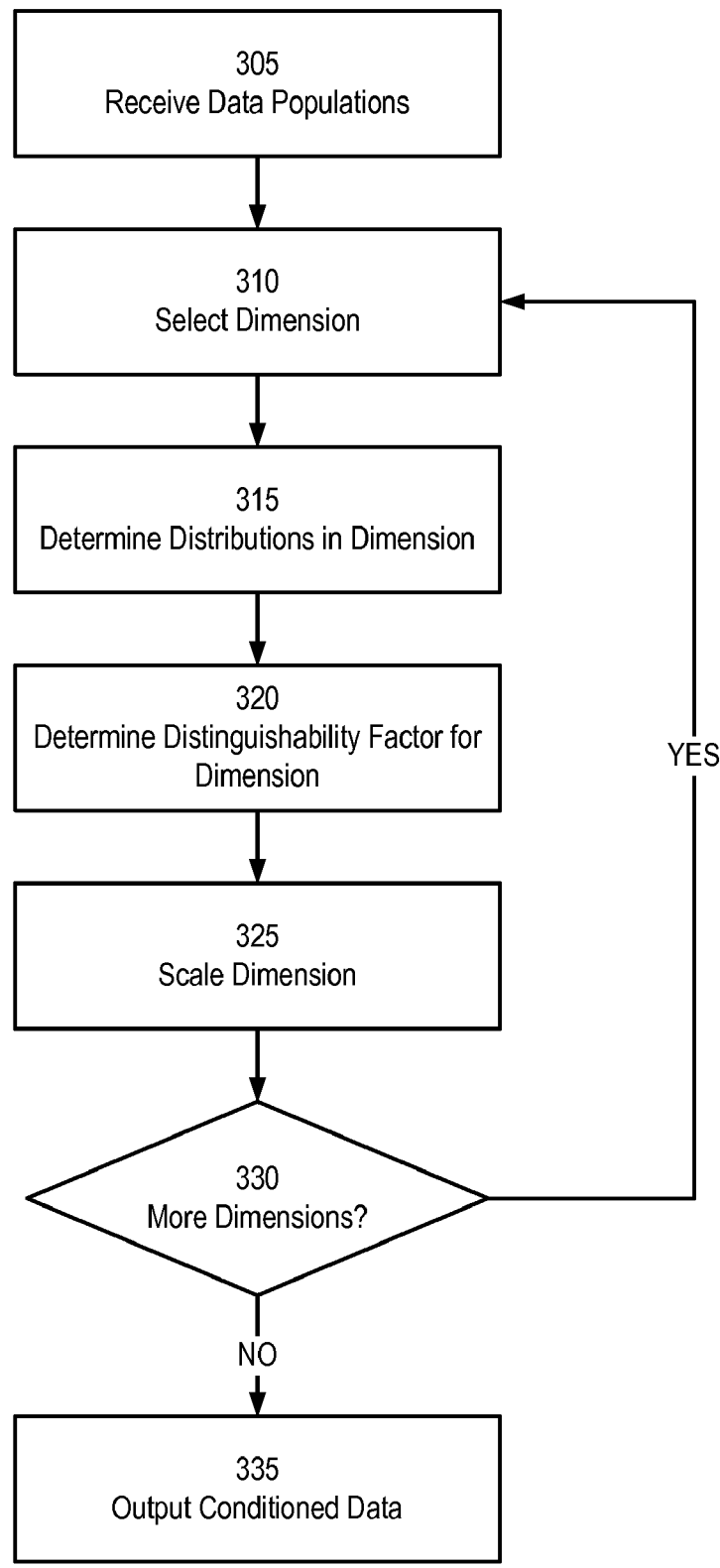
FIG. 3 illustrates one embodiment of a method for conditioning data.

As evidenced by the data conditioning process outlined in reference to FIG. 3, the data conditioner 116 creates conditioned data in which dimensions are scaled according to their significance in data classification. The data populations from which the data conditioner 116 produces conditioned data are representative (e.g., similar in feature content) of the data populations to be classified by the data classifier 118. Hence, training the data classifier 118 using the conditioned data allows for improved data classifier 118 performance, as described above.

In addition to conditioning classified data populations for data classifier 118 training purposes, the conditioning process described in reference to FIG. 3 can also be used to condition unclassified data populations prior to processing the unclassified data populations with the data classifier 118. For the reasons described above, the resulting conditioned unclassified data populations are more readily processed by the data classifier 118 because, for example, dimensions of the unclassified data have been scaled in proportion to their significance for classification.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for conditioning data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for conditioning data for classification by a computer classification system, the method executed by a computer and comprising:

storing in a computer memory a first population of multi-dimensional data and a second population of multi-dimensional data, the first population and the second population having the same dimensions in the data; and for at least one dimension of the data, determining a first distribution for the entire first population in the dimension;

determining a second distribution for the entire second population in the dimension;

comparing the first distribution and the second distribution, and based on the comparison, determining a distinguishability factor between the first distribution and the second distribution for the dimension;

for the first population and the second population, using the determined distinguishability factor to scale the data of the dimension; and storing the scaled data in a data repository.

2. The method of claim 1, wherein the data comprises time-based media data.

3. The method of claim 1, wherein the first distribution and the second distribution are probability distributions.

4. The method of claim 3, wherein determining a distinguishability factor between the first distribution and the second distribution comprises computing a Kullback-Leibler divergence for the first distribution and the second distribution.

5. The method of claim 3, wherein determining a distinguishability factor between the first distribution and the second distribution comprises computing a modified divergence measure which is a summation across a distribution axis of the maximum probability distribution multiplied by the log of the minimum probability distribution.

6. The method of claim 3, wherein determining a distinguishability factor between the first distribution and the second distribution comprises computing a summation across a distribution axis of an absolute difference between the two probability distributions.

7. The method of claim 1, wherein
the first distribution is a first marginal probability distribution in the dimension for the first population; and
the second distribution is a second marginal probability distribution in the dimension for the second population.

8. The method of claim 1, wherein scaling the dimension based on the distinguishability factor comprises multiplying data of the dimension by the distinguishability factor.

9. The method of claim 1, wherein scaling the dimension based on the distinguishability factor comprises increasing amplitudes of data for a more-distinguishable dimension relative to amplitudes of data for a less-distinguishable dimension in a non-linear manner such that variability is increased for the more-distinguishable dimension relative to the less-distinguishable dimension.

10. The method claim 1, further comprising:
for an additional dimension of the data,
determining a first additional distribution for the first population and a second additional distribution for the second population;
determining an additional distinguishability factor between the first additional distribution and the second additional distribution;
for the first population and the second population, scaling data of the additional dimension by the additional distinguishability factor; and
storing the scaled data of the additional dimension in a data repository.

11. The method of claim 1, wherein the dimension comprises a match score.

12. The method of claim 1, wherein the dimension comprises a match score based on a quality of match between a data population and data associated with a known video.

13. The method of claim 1, wherein the dimension comprises a match score normalized by a largest match score included in a group of data populations.

14. The method of claim 1, wherein the dimension comprises a time duration associated with a match score.

15. The method of claim 1, wherein the dimension comprises a count of video fingerprints of a known video that contributed to a match score.

16. A computer-readable storage medium storing computer executable code, the computer-executable code when executed by a processor causing the processor to perform a process for conditioning data for classification, the process comprising:
receiving a first population of multi-dimensional data and a second population of multi-dimensional data, first population and the second population having the same dimensions in the data; and
for at least one dimension of the data,
determining a first distribution for the entire first population in the dimension;
determining a second distribution for the entire second population in the dimension;
comparing the first distribution and the second distribution, and based on the comparison, determining a distinguishability factor between the first distribution and the second distribution for the dimension;
for the first population and the second population, using the determined distinguishability factor to scale the data of the dimension; and
storing the scaled data in a data repository.

17. The computer-readable storage medium of claim 16, wherein the data comprises data associated with one or more videos.

18. The computer-readable storage medium of claim 16, wherein the first distribution and the second distribution are probability distributions.

19. The computer-readable storage medium of claim 18, wherein determining a distinguishability factor between the first distribution and the second distribution comprises computing a Kullback-Leibler divergence between the first distribution and the second distribution.

20. The computer-readable storage medium of claim 18, wherein determining a distinguishability factor between the first distribution and the second distribution comprises computing a modified divergence measure which is a summation across a distribution axis of the maximum probability distribution multiplied by the log of the minimum probability distribution.

21. The computer-readable storage medium of claim 18, wherein determining a distinguishability factor between the first distribution and the second distribution comprises computing a summation across a distribution axis of an absolute difference between the two probability distributions.

22. The computer-readable storage medium of claim 16, wherein
the first distribution is a first marginal probability distribution in the dimension for the first population; and
the second distribution is a second marginal probability distribution in the dimension for the second population.

23. The computer-readable storage medium of claim 16, wherein scaling the dimension by the distinguishability factor comprises multiplying data of the dimension by the distinguishability factor.

24. The computer-readable storage medium of claim 16, wherein scaling the dimension based on the distinguishability factor comprises increasing amplitudes of data for a more-distinguishable dimension relative to amplitudes of data for a less-distinguishable dimension in a non-linear manner such that variability is increased for the more-distinguishable dimension relative to the less-distinguishable dimension.

25. The computer-readable storage medium of claim 16, the process further comprising:
for an additional dimension of the data,
determining a first additional distribution for the first population and a second additional distribution for the second population;

determining an additional distinguishability factor between the first additional distribution and the second additional distribution;

for the first population and the second population, scaling data of the additional dimension by the additional distinguishability factor; and storing the scaled data of the additional dimension in a data repository.

26. The computer-readable storage medium of claim 16, wherein the dimension comprises a match score.

27. The computer-readable storage medium of claim 16, wherein the dimension comprises a match score based on a quality of match between a data population and data associated with a known video.

28. The computer-readable storage medium of claim 16, wherein the dimension comprises a match score normalized by a largest match score included in a group of data populations.

29. The computer-readable storage medium of claim 16, wherein the dimension comprises a time duration associated with a match score.

30. The computer-readable storage medium of claim 16, wherein the dimension comprises a count of video fingerprints of a known video that contributed to a match score.

* * * * *